Patented Mar. 19, 1929.

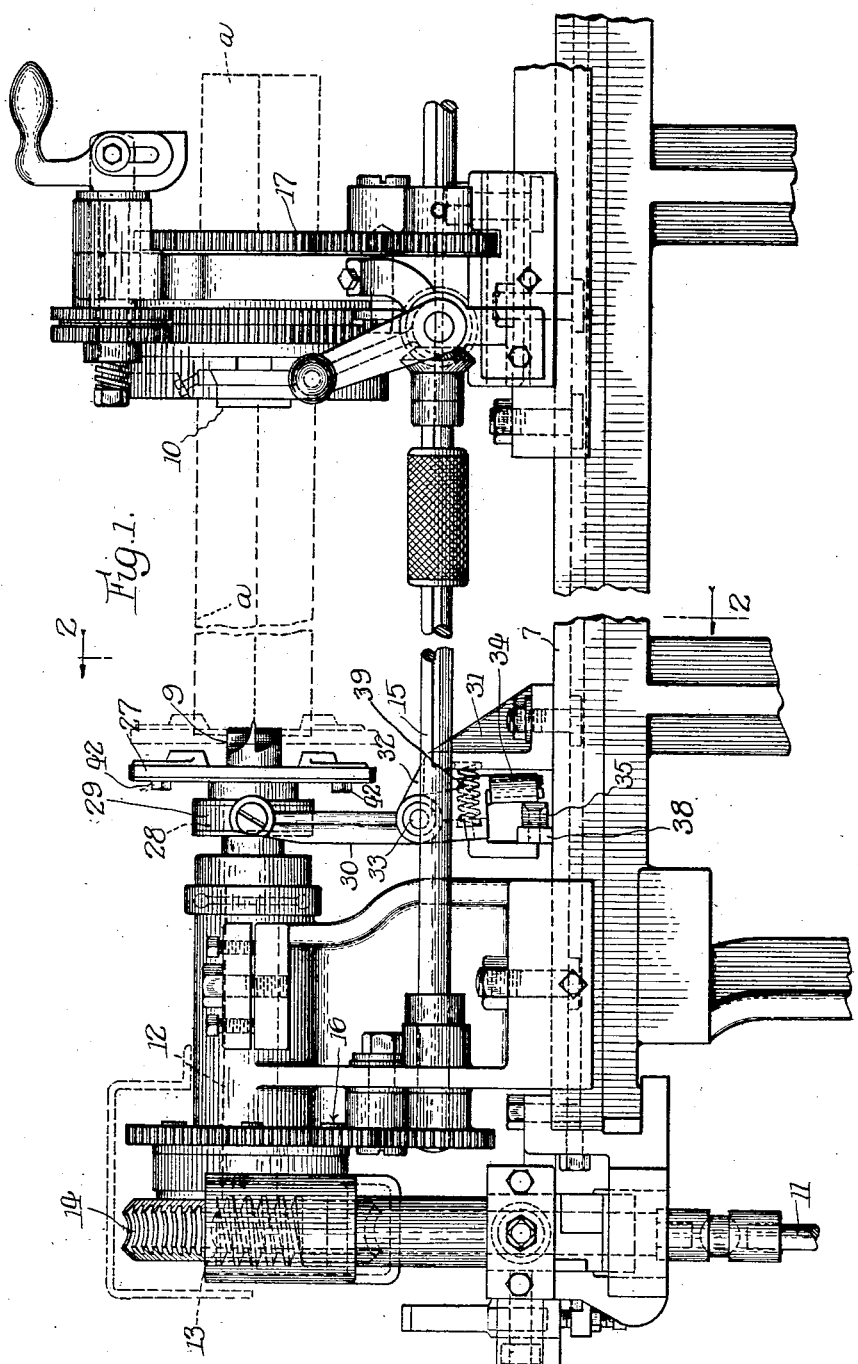

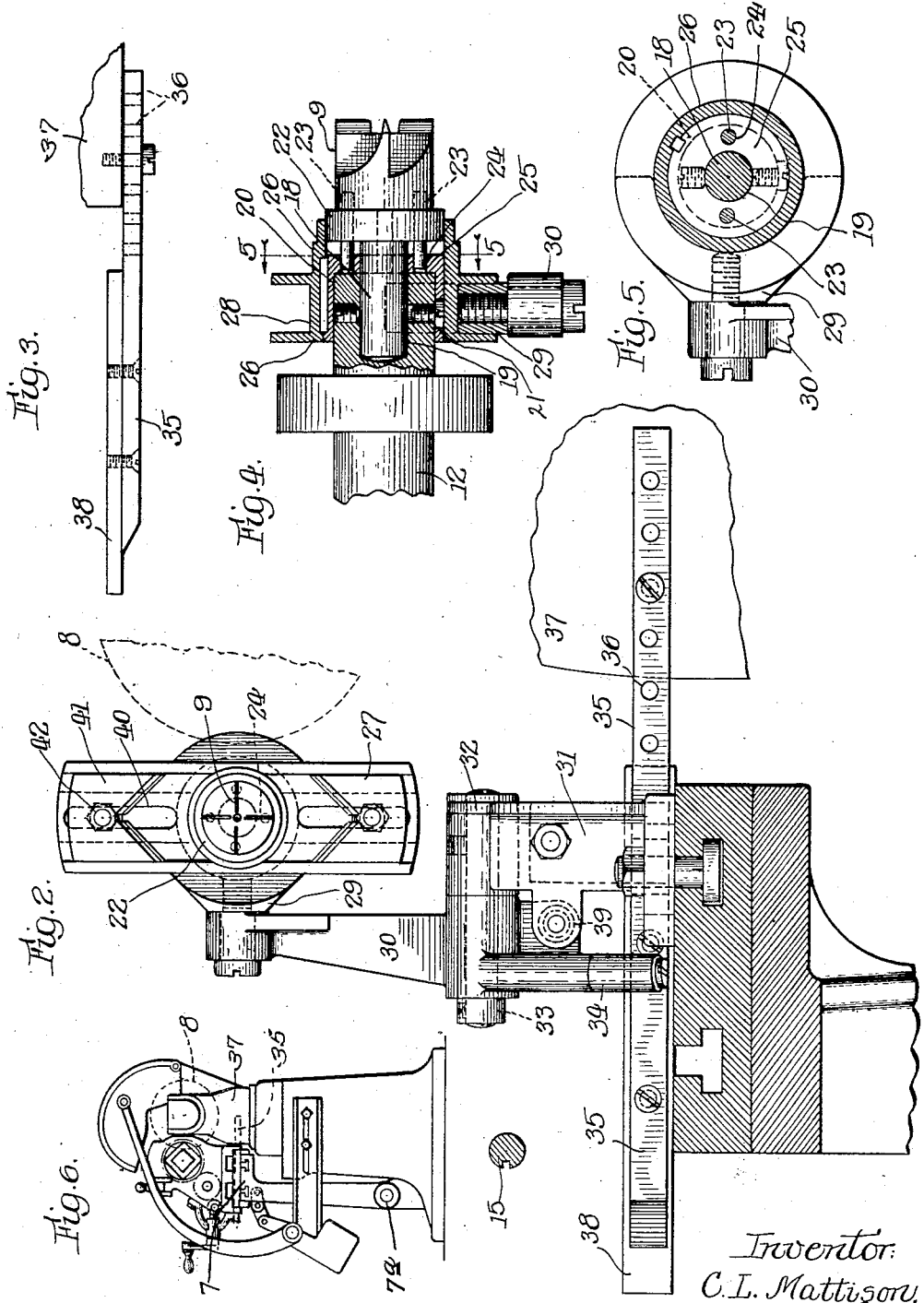

1,706,178

UNITED STATES PATENT OFFICE.

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS.

WORK-CENTERING DEVICE FOR WOOD-TURNING MACHINES.

Application filed March 24, 1924. Serial No. 701,273.

The invention pertains to turning machines or lathes and particularly to lathes of the type used for shaping articles made of wood such, for example, as the ornamental parts of furniture and the like.

The object of the invention generally stated is to provide a means of an advantageous construction adapted to facilitate the operation of centering the work with respect to the headstock center.

A further object is to provide a means of the character stated which is automatically operable in the movements of the carriage which supports the work, to move the centering device into and out of operative position as the carriage moves out of and into its operative positions.

In the accompanying drawings,

Figure 1 is a fragmentary front elevational view of a wood turning machine embodying my invention.

Fig. 2 is a fragmentary vertical sectional view showing the carriage and the work supporting means thereon with the centering device associated therewith.

Fig. 3 is a plan view of a cam means employed to effect the automatic operation of the centering device.

Fig. 4 is a fragmentary vertical sectional view illustrating the construction of the headstock center with a portion of the centering means associated therewith.

Fig. 5 is a fragmentary vertical sectional view taken approximately in the plane of line 5—5 of Fig. 4.

Fig. 6 is a diagrammatic view of the machine.

In the accompanying drawings I have shown a shaping or turning machine of the type in which the cutter is mounted to turn on a fixed axis and the work is supported by the carriage for movement into and out of engagement with the cutter. The centering means therefore is in this instance arranged to be actuated in the movements of the carriage, and briefly it comprises guide means for the work slidable longitudinally relative to the headstock center for movement into a position slightly beyond the center whereby initially to position the work prior to its being driven into engagement with the center, and thereupon into inoperative position in a direction away from the work. The operating means for said guide means is carried by the table and means comprising a cam in this instance is stationarily supported upon the base of the machine for actuating said operating means, the arrangement being such that as the carriage moves to carry the work away from the cutter, the guide means automatically assumes an operative position with respect to the stock center, and as the carriage moves toward the cutter, the guide means automatically moves into inoperative position away from the center.

The machine herein shown comprises a hinged plate carriage 7 adapted to support the work and swingably mounted as at 7ª for movement (Fig. 6) to carry the work into and out of operative association with a cutter shown diagrammatically at 8 (Fig. 2). The work is arranged to be held between a headstock center 9 and a chuck 10 (Fig. 1) both of which are arranged to be actuated to revolve the work to position it with respect to the cutter in accordance with the shape which it is desired to impart thereto. The chuck 10 is preferably of the type illustrated and described in my copending application Serial No. 701,274 filed March 24, 1924. In the present instance power is communicated from a drive shaft 11 to the headstock spindle 12 through a worm 13 and worm wheel 14. The tailstock is arranged to be driven from the headstock spindle by means of a shaft 15, one end of which is connected by a chain of spur gearing 16 with the headstock spindle 12 and the other end of which is connected with the chuck by a chain of spur gearing 17.

Referring now to Fig. 4, the center 9 is hereinshown as rigidly secured to the headstock spindle 12 by means comprising a shank 18 rigid with the center 9 and entering an axial bore 19 in the inner end of the spindle 12. Upon the spindle 12 is rigidly secured a sleeve 20 as by means of a screw 21 and the center 9 has forwardly of the shank 18 a head 22 carrying pins 23 which engage in holes 24 in the face of a flange 25 which is formed integral with the sleeve 20. It will be seen that the sleeve and said flange constitute a cup-shaped member fitting over the end of the spindle 12.

The head 22 of the center and the sleeve 20 are preferably made of the same external diameter, and slidable longitudinally on the head and sleeve is a cylindrical member 26 upon the forward end of which is rigidly secured a plate 27. The member 26 has a splined connection with the sleeve 20 so as to rotate therewith and at the same time be movable longitudinally relative thereto, and the rear end of the member is constructed to provide an annular groove 28 adapted to receive a yoke 29 on the upper end of an operating lever 30. The latter is mounted to turn on a transverse axis, being supported by a bracket 31 adjustably mounted upon the carriage 7. Said bracket 31 has its upper end offset as at 32 to form a bearing in which the lever 30 is pivoted as at 33. The lower end of the lever projecting below said offset portion of the bracket carries a depending roller 34 which is adapted to engage with a cam bar 35 adapted to be secured to the base in any suitable manner as indicated in Fig. 3. In the present instance I have provided in the rear end of the bar a plurality of apertures 36 so that it may be secured to the portion 37 of the base in any desired position of adjustment. The bar 35 carries a guide bar 38 at its forward end which rides upon the upper surface of the carriage 7 so as to swing the bar 35 about its pivotal connection and thus maintain a constant relation between the cam bar 35 and the roller 34. A coiled expansion spring 39 which is interposed between the bracket 31 and the lower end of the lever 30 tends to hold the roller 34 in position against the cam bar and said guide bar.

The arrangement is such that when the carriage is moved to carry the work into engagement with the cutter 8, the roller 34 riding upwardly upon the cam bar 35 actuates the lever 30 to move the plate 27 in a direction longitudinally away from the work held by the center 9. Conversely when the carriage moves into its inoperative position away from the work, the roller 34 riding off of the cam bar 35 onto the guide bar 38, causes the plate 27 to move longitudinally with respect to the center 9 into a position slightly beyond it.

The plate 27 is provided with adjustable means whereby when in such position beyond the point of the center 9, the work may be guided into engagement with the center. In the present instance I have shown the plate 27 as provided upon opposite sides of its axis with a pair of slots 40, and a pair of guide members 41 are arranged to be held in adjusted position upon the forward face of the plate 27 by means of bolts 42 entered through said slots. The guide members are in the present instance shown as being V-shaped in form at their inner ends whereby to receive the corners of a square piece of stock.

In Fig. 1 I have shown in broken lines a piece of work or stock $a$ mounted between the centers 9 and 10 and I have also shown in broken lines the position occupied by the guide means when the carriage is in its inoperative position away from the work. When the carriage is in its operative position with the work held in engagement with the cutter, the plate 27 occupies the position shown in full lines.

I claim as my invention:

1. In a machine of the class described, the combination of a rotatable power driven stock center, a support therefor, means for positioning the stock with respect to the center, said means comprising a tubular member slidable longitudinally on said center and rotatable therewith, a plate mounted coaxially of said member and transversely thereto, a pair of guide members mounted for radial adjustment on said plate, said tubular member having a circumferential groove, and means engaging said groove adapted to impart sliding movement to said member relative to said stock center.

2. In a machine of the class described, the combination of a rotatable power driven stock center, a support therefor, means for positioning the stock with respect to the center, said means comprising a plate splined on said center for rotation therewith and arranged for axial sliding movement thereon, and a pair of stock-engaging members mounted for radial adjustment on said plate and adapted to position the stock relative to said center.

3. In a machine of the class described, a frame, a rotatable chuck and a rotatable stock center coaxially mounted at opposite ends of said frame, a common driving means operable to rotate said chuck and said stock center in unison, and means on said stock center for positioning the stock with respect to the center, said means comprising a plate mounted coaxially on and keyed to said center and arranged for axial sliding movement thereon, and radially adjustable stock-engaging members mounted on said plate.

In testimony whereof, I have hereunto affixed my signature.

CARL LAWRENCE MATTISON.